United States Patent [19]

Farnworth et al.

[11] Patent Number: 5,017,424

[45] Date of Patent: May 21, 1991

[54] SKIN TIGHT CHEMICAL/BIOLOGICAL PROTECTIVE SUIT

[75] Inventors: Brian Farnworth, Kinburn; James K. Dix, Ottawa, both of Canada

[73] Assignee: Her Majesty the Queen in right of Canada, as represented by the Minister of National Defence of Her Majesty's Canadian Government, Ottawa, Canada

[21] Appl. No.: 160,286

[22] Filed: Feb. 25, 1988

[30] Foreign Application Priority Data

May 21, 1987 [CA] Canada .................................... 537566

[51] Int. Cl.$^5$ ...................... A41D 13/00; A41D 31/02; B32B 5/18; B32B 5/32

[52] U.S. Cl. ........................................... 428/230; 2/1; 2/243 A; 2/DIG. 1; 428/231; 428/244; 428/248; 428/249; 428/250; 428/252; 428/253; 428/254; 428/283; 428/286; 428/287; 428/308.4; 428/316.6; 428/317.9; 428/422; 428/423.7; 428/423.9; 428/425.1

[58] Field of Search ............... 428/230, 244, 248, 252, 428/253, 231, 283, 308.4, 316.6, 317.9

[56] References Cited

U.S. PATENT DOCUMENTS

| | | | |
|---|---|---|---|
| 3,232,819 | 2/1966 | Satas | 428/230 |
| 4,554,198 | 11/1985 | von Blucker et al. | 428/244 |
| 4,692,369 | 9/1987 | Nomi | 428/230 |
| 4,761,324 | 8/1988 | Rautenberg | 428/230 |
| 4,904,343 | 2/1990 | Giglia et al. | 428/283 |
| 4,954,392 | 9/1990 | Goldberg | 428/317.9 |

*Primary Examiner*—James C. Cannon
*Attorney, Agent, or Firm*—William R. Hinds

[57] ABSTRACT

The invention disclosed relates to a novel composite material resistant to passage therethrough of noxious substances. The novel composite includes a first layer which may be in the form of a film or coating, of a water and particulate material impermeable, vapor permeable material which is also resistant to sebaceous excretions. A second layer of a vapor permeable stretch fabric material is also provided. Disposed between said first and second layers is a third layer of vapor permeable stretchable fabric material containing a particulate adsorbent material for the noxious substances. Depending upon the application, other optional layers may be included. The composite is stretchable to an extent of 30 to 500% and is intended for use in making close-fitting clothing to protect the wearer from noxious substances.

17 Claims, No Drawings

SKIN TIGHT CHEMICAL/BIOLOGICAL PROTECTIVE SUIT

This invention relates to clothing for the protection of individuals from noxious chemicals in the form of vapours, liquid droplets and airborne solid particles and from noxious biological substances such as airborne bacteria and viruses, which may be absorbed by or through the skin. In particular, the invention is directed to a novel composite material from which protective clothing may be made.

Protection of the skin may be achieved by wearing clothing that is impermeable to gases, liquids and solid particles giving protection against all hazards. Alternatively, clothing which is permeable to the passage of air and airborne hazards may be worn if it incorporates a layer of adsorptive materials, such as activated charcoal. Such clothing provides good protection against large drops and particles (millimetre size) and vapours, but very little against small particles (micrometre size).

Present clothing, whether permeable or impermeable, is usually loose-fitting, often worn as overgarments to regular work or combat clothing. The loose fit traps a layer of air which gives resistance to the transport of heat by conduction and convection and is resistant to the transport of water vapour by diffusion and convection. The fabric itself provides a resistance to the flow of heat by radiation and to the flow of water vapour by diffusion (especially in an impermeable garment). As a result, the wearing of these garments in hot environments and/or by active workers results in insufficient heat loss from the body (by conduction/convection, radiation and evaporation of sweat). Therefore, to avoid heat stress, activity rates and/or exposure times must be limited.

According to the invention, a novel composite material resistant to the passage therethrough of noxious substances is provided, comprising a first layer of water and particulate material impermeable, vapour permeable, sebaceous secretion-resistant material; a second layer of vapour permeable, stretchable fabric material; and disposed between said first and second layers, a third layer of vapour permeable, stretchable fabric material containing a particulate adsorbent material for said noxious substances, wherein the composite material is stretchable to an extent of 30 to 500 percent, and wherein either the third layer or the first and second layers or all three layers are repellent to organic liquids.

When formed into protective clothing, the novel composite material according to the invention is made into a body suit which fits closely to the skin of the wearer to eliminate trapped air layers and maximize heat loss by vapour transmission. In order to maximize heat loss by conduction/convection and radiation, the suit is worn as the only garment, is kept as thin as possible and, in order to maximize the loss of heat by evaporation of sweat, is made of vapour permeable materials. When heat stress is not a problem, the suit may be worn as an undergarment. In high heat stress situations, the suit could be worn alone. In less arduous situations, the suit could be worn under regular clothing appropriate to the atmospheric conditions and the work to be performed. Changes in conditions of work or weather can be adapted to readily by the donning and doffing of outer layers without loss, even briefly, of chemical and biological protection.

The novel composite material according to the invention may include up to five layers. Each layer serves a purpose which may or may not be necessary depending upon the specific nature of the hazard. Accordingly, some layers may be eliminated in certain instances as will be apparent hereinafter.

The first (inner) layer of the novel composite material is a film material which is permeable to the diffusion of water vapour but impermeable to the passage of liquid water and airborne particles of micrometre and sub-micrometre sizes. Several such films are available but only those which are stretchable and are resistant to contamination by sebaceous secretions are suitable. (Hydrophillic oils present in sebum destroy the liquid impermeability of some films.) Suitable choices include microporous polyurethane films. This layer protects the adjacent layer from contamination by sweat or sebum. The first layer may be treated with fluorochemical finishes for repellency to organic liquids. Suitable repellents include Scotchgard ® and Zepel-B ®. Alternatively, the first layer may be formulated to be inherently repellent to organic liquids.

The second (outer) layer is a layer of any durable vapour permeable stretch fabric. Its main function is to protect the inner layers from mechanical hazards such as abrasion, snagging, etc.

The third (middle) layer disposed between the first and second layers is of a vapour permeable, stretch fabric containing a particulate adsorbent for the noxious substances. This layer may be impregnated with the adsorbent by means of a suitable organic binder, i.e. one which does not significantly reduce the capabilitY of the adsorbent. Suitable organic binders include: natural rubbers, synthetic rubbers, polyethlacrylate, and polyvinylacetate. Acrylic latex (Union Carbide UCAR874) has been found acceptable. The adsorbent is preferably activated carbon in powder form, of a median diameter of 0.5 to 25 microns, most preferably about 5 microns. Activated carbon in other than powder form may be used if the stretchability of the fabric is not unduly reduced. Alternatively, the adsorbent may be fixed to the fabric by means of an adhesive such as a latex. If the third (middle) layer is organic liquid repellent, no other layers need be. However, if the third (middle) layer is not organic liquid repellent, the first layer and the second or fourth layers (if present) are organic liquid repellent.

The first and third layers together may comprise polyurethane-coated stretch fabrics such as DERMOFLEX ®, a polyurethane coating applied to a stretch fabric or Tufferyn ®, a polyurethane film which may be applied to the stretch fabric by transfer coating or lamination.

Additionally, a fourth, vapour permeable, liquid impermeable film layer, similar but not necessarily the same as the first layer, may be included in the novel composite between the third (middle) layer and the second (outer) layer. This layer serves to protect the activated carbon in the middle layer. Similarly to the first layer, the fourth layer may be organic liquid repellent. Accordingly, it may be coated with a fluorochemical finish such as Scotchgard ® or Zepel-B ® to prevent its penetration by organic liquids such as organo phosphates. The inclusion of the fourth layer also gives added protection against airborne particles of micrometre and sub-micrometre sizes. If this additional (fourth) layer is not included or is not organic liquid repellent, the second (outer) layer is treated with a fluorochemical finish, such as Scotchgard ® or Zepel-B ®, to prevent organic liquid penetration. If the fourth layer is included, and is organic liquid repellent, then the second (outermost) layer may be a water-wettable layer. In this case, evaporative cooling may be achieved by soaking the second layer with water in high stress situations.

Optionally, a fifth innermost layer is provided adjacent the first layer to protect the first layer from tearing while donning and doffing of the suit and to provide some measure of tactile comfort to the wearer. This layer is a water absorbent knit fabric. It could be almost any textile fabric with hydrophillic properties. Suitable fabrics include cotton or a cotton/polyester blend.

The optional inner (fifth) and second (outer) layers could be of the same stretch knit fabric of a weight in the range of 50-200 g/m². The vapour permeable films (i.e. the first and optional fourth layer) would be of a weight of 10-75 g/m² and the activated carbon-containing layer (including base material and charcoal impregnants) would be of a weight from 50 to 250 g/m².

All five layers are stretchable but are not necessarily the same material. The first and fourth layers are preferably the same and the innermost (fifth) and outer (second) layers may be of the same material. The activated carbon-containing (third) layer, may or may not be the same as the outer (second) and (fifth) innermost layers.

A minimum of 30% stretch, (i.e. the ability to be stretched to dimensions 30% greater than the original dimensions without damage and relax to the orginal dimensions when the stress is removed) is required to provide for normal body movements. The maximum degree of stretch is about 500%, the preferred range being about 75 to 200%, to minimize the number of sizes of clothing to fit a given population. Examples of stretch fabrics are special knits, Spandex ®-containing knits and wovens, non-woven spunbonded polyurethane fabrics, cotton and cotton/polyester knits.

The layers are assembled by direct lamination during film formation or by transfer lamination and bonding of the layers with suitable hot melt adhesives. For example, the first and fourth (if present) layers could be coated onto the third layer, followed by lamination of the second and fifth (if present) layers. Each layer could be of a different thickness.

The embodiments of the invention in which an exclusive property or privilege is claimed is defined as follows:

1. A composite laminate material of adhered layers resistant to passage therethrough of noxious substances, comprising,
   a first inner layer of water and particulate material impermeable, vapour permeable, sebaceous secretion-resistant, material;
   a second outer layer of vapour permeable, stretchable fabric material; and disposed between said first and second layers;
   a third intermediate layer of vapour permeable, stretchable fabric material containing a particulate absorbent material for said noxious substances, wherein the composite material is stretchable to an extent ob 30 to 500 percent, and wherein either the third layer or the first and second layers or all three layers are repellent to organic liquids.

2. A composite material according to claim 1, wherein the composite material is stretchable to an extend of 75 to 200 percent.

3. A composite material according to claim 2, wherein the particulate absorbent is activated carbon in powder form of a median diameter of 0.5 to 25 microns.

4. A composite material according to claim 3, wherein the activated carbon is impregnated in the third layer by means of a suitable organic binder.

5. A composite material according to claim 4, wherein the suitable organic binder is selected from the group consisting of natural rubbers, synthetic rubbers, polyethlacrylate and polyvinylacetate.

6. A composite material according to claim 5, wherein the suitable oganic binder is acrylic latex.

7. A composite material according to claim 6, wherein repellency to organic liquids is achieved by means of a coating with an organic liquid repellent material.

8. A composite material according to claim 7, additionally comprising an innermost (fifth) layer of a water-absorbent knit fabric material adjacent the first layer.

9. A composite material according to claim 8, wherein the water-absorbent knit fabric material is selected from the group consisting of cotton and cotton/polyester blends.

10. A composite material according to claim 9, wherein the third layer is organic liquid replelent and additionally comprising a fourth vapour permeable, liquid impermeable film layer between the third layer and the second layer.

11. A composite material according to claim 9, additionally comprising a fourth vapour permeable, liquid impermeable film layer between the third layer and the second layer, wherein the first and fourth layers are organic liquid repellent.

12. A composite material according to claim 10, wherein the first and fourth layers are of the same material.

13. A composite material according to claim 9, wherein the second and innermost (fifth) layers are of the same fabric material.

14. A composite material according to claim 9, wherein the third layer is the same fabric material as the second and innermost (fifth) layers.

15. A composite material according to claim 1, the form of clothing.

16. A composite material according to claim 1, wherein the first layer is made of a textile fabric coated with a polyurethane coating material.

17. A composite material according to claim 10, wherein the first and fourth layers comprise a polyurethane film.

* * * * *